US006954312B2

(12) United States Patent
Kikuchi

(10) Patent No.: US 6,954,312 B2
(45) Date of Patent: Oct. 11, 2005

(54) LIGHT SCANNING UNIT

(75) Inventor: Susumu Kikuchi, Yokohama (JP)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/744,076

(22) Filed: Dec. 24, 2003

(65) Prior Publication Data

US 2004/0174606 A1 Sep. 9, 2004

(30) Foreign Application Priority Data

Dec. 27, 2002 (JP) ....................................... 2002-381656

(51) Int. Cl.[7] ................................................ G02B 27/14

(52) U.S. Cl. ........................ 359/629; 359/204; 359/205

(58) Field of Search ................................ 359/629, 641, 359/636, 204, 205, 207, 710, 216; 347/261

(56) References Cited

U.S. PATENT DOCUMENTS 5,341,158 A * 8/1994 Appel et al. ................ 347/241
5,583,559 A * 12/1996 Nakamura et al. .......... 347/260

FOREIGN PATENT DOCUMENTS

JP 09-096769 4/1997
JP 10-35011 2/1998
JP 2001-21821 * 1/2001

* cited by examiner

*Primary Examiner*—Hung Xuan Dang
*Assistant Examiner*—Joseph Martinez
(74) *Attorney, Agent, or Firm*—Roylance, Abrams, Berdo & Goodman, LLP

(57) ABSTRACT

A light scanning unit having a simple structure and a low-priced multi-beam shape is provided. The light scanning unit includes a composite light source in which a plurality of light sources for emitting coherent light having different wavelengths are arranged adjacent to one another and an optical axis of each light source is arranged substantially parallel to each other and which emits light at a divergence angle centering on each optical axis. The plurality of coherent emitted light comprising a light beam. The light scanning unit further comprises a collimator lens which is arranged on an approximately central axis of the optical axis of each light source and collimates the light beam emitted from the composite light source, and a cylinder lens for condensing the light beam emitted from the collimator lens, a polygonal rotating mirror for scanning the light beam condensed by the cylinder lens in a main scanning direction on an exposed surface of an exposed object. The light scanning unit also comprises an optical system comprising one mirror or a group of mirrors, which condenses light irradiated by the polygonal rotating mirror onto an image surface and makes a scanning speed of an exposed point be nearly uniform.

7 Claims, 1 Drawing Sheet

LIGHT SCANNING UNIT

BACKGROUND OF THE INVENTION

This application claims priority to Japanese Patent Application No. 2002-381656, filed on Dec. 27, 2002, in the Japanese Intellectual Property Office, the disclosure of which is incorporated herein in its entirety by reference.

1. Field of the Invention

The present invention relates to a light scanning unit, and more particularly, to a light scanning unit suitable for an exposure device for an electrophotographic apparatus, such as a color printer having a plurality of exposed objects.

2. Description of the Related Art

Electrophotographic exposure devices are generally categorized as devices using either a laser diode or devices using a light emitting diode (LED). The electrophotographic exposure device (EPE device) that uses an LED performs an exposure process by mapping one LED per one dot of a pixel of an image to be recorded in an exposed object. In general, the EPE device using the LED uses a light source called a "LED head" in which a plurality of LEDs are arranged.

The light source is configured in such a manner so as to arrange an LED chip in which a plurality of LEDs are formed on a substrate and to form a plurality of LED arrays. Japanese Patent Publication No. Hei 10-035011 (published on Feb. 10, 1998) entitled "Light Emitting Diode Array and Fabrication thereof", the entire contents of which are incorporated herein by reference, discloses this type of configuration. The disclosed apparatus condenses light onto an image-formed surface by provided an optical system between the LED and the exposed surface of an exposed object.

The EPE device that uses the laser diode scans a laser beam in a main scanning direction on an exposed surface of an exposed object using a light scanning unit.

The EPE device using the laser diode uses an F-θ lens to maintain the same scanning speed and same beam shape on an exposed surface. Japanese Patent Publication No. Hei 09-096769 (published on Apr. 8, 1997) entitled "Method and Device for adjusting Optical Axis of Optical Scanner and Optical Scanner", the entire contents of which are incorporated herein by reference, discloses this type of configuration.

In the disclosed apparatus of Japanese Patent Publication No. Hei 09-096769, the laser beam emitted from a laser diode is diffused. The laser beam is then collimated by a collimator lens. The shape of the collimated laser beam is restricted to the shape of a slit, and the laser beam is focused by a cylinder lens in a subscanning direction on the reflective surface of a polygonal rotating mirror, which is a light scanning unit. Subsequently, light scanned in the main scanning direction by the polygonal rotating mirror is focused by an F-θ lens (or lens group) on the exposed surface of the exposed object and is scanned at a uniform speed.

The electrophotographic exposure device using the LED can be made smaller. However, the EPE device using the LED made smaller has several problems. First, a plurality of LED chips should be precisely arranged on a substrate; second, the required circuitry is complex; third, due to the characteristics of the optical system, the distance from each LED chip to the exposed surface of the exposed object should be maintained precisely; and fourth, the quantity of light emitted between different LED is non-uniform, and should be corrected.

In addition, the optical system for scanning a laser diode as a light source which uses a polygonal rotating mirror to scan the light source has a problem as well. Maintaining or knowing the distance with respect to an exposed surface is comparatively low, since the spot of light quantity on an exposed surface is small, the circuit is simple, and the depth of focus is deep. Meanwhile, color electrophotographic printers have been recently developed. These electrophotographic printers need to form an image four times, as compared to a conventional black/white printer (which has to form an image only once). Color printers need to form an image four times because color images are typically produced with four colors, such as cyan, magenta, yellow, and black, into one image.

Electrophotographic color printers are categorized into two types, single pass electrophotographic color printers or multi-pass electrophotographic color printers. The single pass electrophotographic color printer mounts one exposure device in one drum, performs a development process using a four-color developer, superimposes an image on an intermediate transfer body, and transfers the superimposed image onto a sheet of paper.

The multi-pass electrophotographic color printer mounts four developers and four exposure devices, and four photosensitive bodies. Therefore, the mechanism appears as four conventional black/white printers superimposed on one another.

In the single pass electrophotographic color printer, the output speed is reduced to one-quarter of that of a multi-pass electrophotographic color printer, requiring the image to be superimposed four times. As a result, the single pass electrophotographic color printer is low speed and the mechanism for moving a developer is complex. The single pass electrophotographic color printer can, however, configure the photosensitive drum and exposure device as a single body.

The printing speed of the multi-pass electrophotographic color printer is faster as compared to the single pass electrophotographic color printer. However, the multi-pass electrophotographic color printer requires four exposure devices and four photosensitive bodies and thus, its structure becomes complex.

The present invention relates to an exposure device for the multi-pass electrophotographic color printer.

Conventional multi-pass electrophotographic color printers typically incorporate the same number of laser diodes having the same number as the number of exposed objects. Since there are four exposed objects in the conventional multi-pass electrophotographic color printer, there are four laser diodes. Similarly, the multi-pass electrophotographic color printer also requires a polygonal rotating mirror or an F-θ lens having the same number as the number of exposed objects. Again, since there are four exposed objects, the conventional multi-pass electrophotographic color printer has either four lens or four polygonal mirrors. As a result, the size of an apparatus becomes larger, and consequently, manufacturing costs are increased.

SUMMARY OF THE INVENTION

The present invention provides a light scanning unit having a simple structure and a low-priced multi-beam shape.

According to an embodiment of the present invention, there is provided a light scanning unit which comprises a composite light source in which a plurality of light sources for emitting coherent light having different wavelengths are arranged adjacent to one another and an optical axis of each light source is arranged substantially parallel to each other and which emits light at a divergence angle centering on each optical axis, and a collimator lens which is arranged on an approximately central axis of the optical axis of each light source and collimates the light beam emitted from the composite light source. The light scanning unit further comprises a cylinder lens for condensing the light beam emitted from the collimator lens, a polygonal rotating mirror for scanning the light beam condensed by the cylinder lens in a main scanning direction on an exposed surface of an exposed object, and an optical system comprising one mirror or a group of mirrors, which condenses the light irradiated by the polygonal rotating mirror onto an image surface and makes the scanning speed of an exposed point be nearly uniform.

BRIEF DESCRIPTION OF THE DRAWINGS

The above aspects and advantages of the present invention will become more apparent by describing in detail an exemplary embodiment thereof with reference to the attached drawing in which.

DETAILED DESCRIPTION OF THE INVENTION

Figure 1:
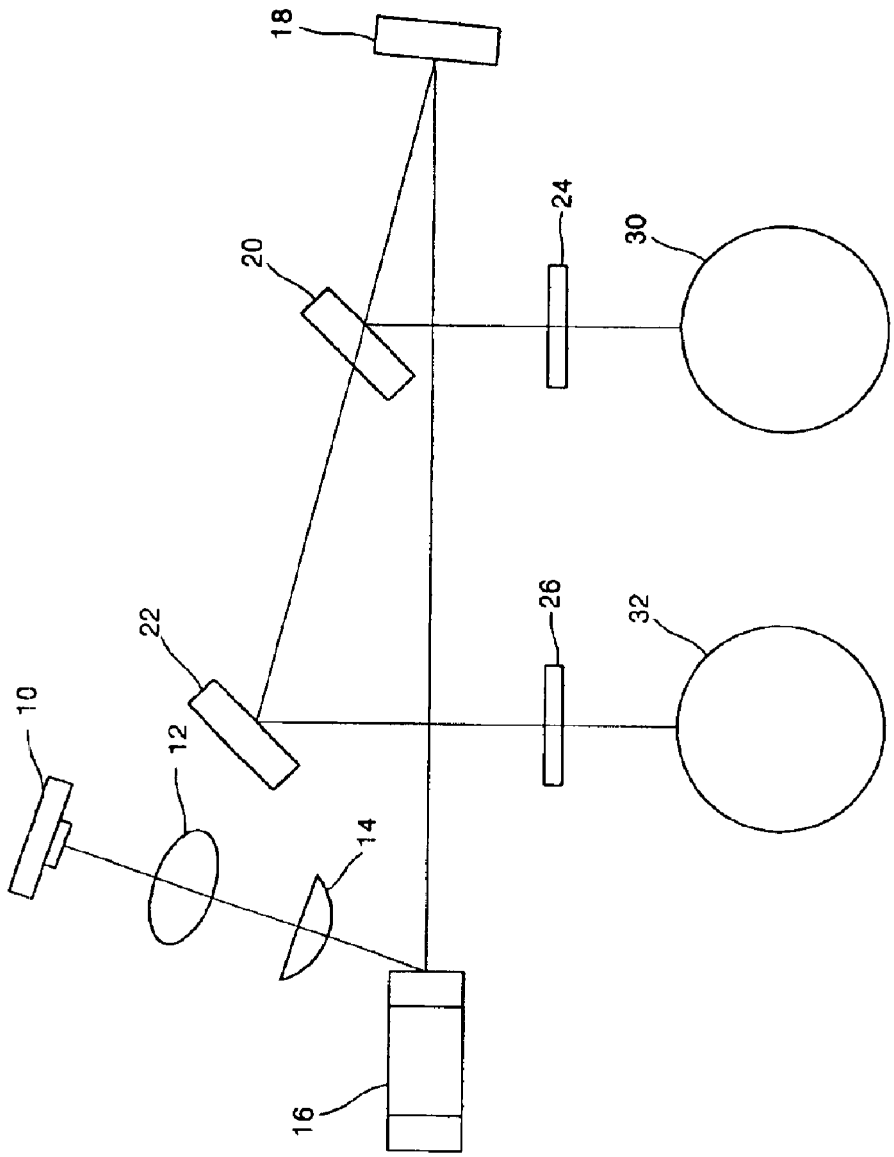
FIG. 1 illustrates a block diagram of an optical arrangement of a light scanning unit according to an embodiment of the present invention.

Referring to FIG. 1, a light scanning unit according to an embodiment of the present invention includes a composite light source 10 for emitting a plurality of (in an embodiment of the present invention, two) coherent light beams having different wavelengths, a collimator lens 12, a cylinder lens 14, a polygonal rotating mirror 16, an f-theta (F-θ) mirror 18, a half mirror 20, a mirror 22, a first band pass filter 24, and a second band pass filter 26.

In an embodiment of the present invention, the composite light source 10 is a multi-beam laser diode for emitting two coherent light beams having different wavelengths (for example, wavelengths of 650 nm and 780 nm). The two laser diodes are arranged adjacent to each other. The distance between the two light sources (i.e., the two laser diodes), which is also the distance between their optical axes, is typically less than 1 mm. The optical axis of the light sources are arranged substantially parallel to each other. The configuration of the composite light source 10 is well-known to persons skilled in the art of the invention, and thus, detailed descriptions thereof will be omitted.

The collimator lens 12 collimates a light beam emitted from the composite light source 10 into a beam of parallel rays. The cylinder lens 14 condenses the light beam onto a reflective surface of the polygonal rotating mirror 16. The cylinder lens 14 has the capability of performing a focusing function only in a subscanning direction of a first and second exposed objects 30 and 32 with respect to the transmitted light beam, and does not have the capability of performing a focusing function in the main scanning direction. The subscanning direction thereof is a rotational direction of the first and second exposed objects 30 and 32, and the main scanning direction thereof is an axial direction of the first and second exposed objects 30 and 32.

The polygonal rotating mirror 16 is rotated and driven by a driving unit (not shown) at a predetermined angular velocity and scans an incident light beam in the main scanning direction of the exposed surfaces of the first and second exposed objects 30 and 32 according to its rotation.

The F-θ mirror 18 has the same function as the function of an F-θ lens. In an embodiment of the present invention, the F-θ mirror 18 condenses a light beam onto the exposed surface of the first and second exposed objects 30 and 32, reflects the light beam to uniformly scan, and is configured by a free curved surface.

The half mirror 20 has a function of splitting the light beam reflected by the F-θ mirror 18 into two paths. The first band pass filter 24 transmits only a light beam having a wavelength of 650 nm (the shorter wavelength), and the second band pass filter 26 transmits only a light beam having a wavelength of 780 nm (the longer wavelength).

The first and second exposed objects 30 and 32 are photosensitive drums, for example, and are rotated and driven by a driving unit (not shown) in a subscanning direction. In an embodiment of the present invention, the optical system that follows the polygonal rotating mirror 16 is comprised of one or more mirrors, and thus, there is no wavelength dependency of the light beam. Consequently, a correction unit for correcting a wavelength characteristic need not to be installed.

In the structure as described above, two light beams having different wavelengths are intensity-modulated by a modulation unit (not shown) according to information on different images and are emitted from the composite light source 10. The two light beams are emitted at a divergence angle centering on an optical axis.

The light beams emitted from the composite light source 10 are collimated by the collimator lens 12, are focused by the cylinder lens 14, and are condensed onto the reflective surface of the polygonal rotating mirror 16.

The light beams reflected by the polygonal rotating mirror 16 are reflected by the F-θ mirror 18 and are incident on the half mirror 20. The light beams incident on the half mirror 20 are split into two parts. A first split light beam created by the beam-splitting effect of the half mirror 20 is irradiated onto the exposed surface of the first exposed object 30 through the first band pass filter 24 and is scanned in the main scanning direction on the exposed surface of the first exposed object 30 according to rotation of the polygonal rotating mirror 16. Since only the light beam having a shorter wavelength of 650 nm is transmitted through the first band pass filter 24, the light beam having a shorter wavelength of 650 nm is condensed onto the exposed surface of the first exposed object 30 by the F-θ mirror 18, and is scanned at a uniform speed in the main scanning direction of the exposed surface of the first exposed object 30.

The second split light beam created by the beam-splitting effect of the half mirror 20 is reflected by the mirror 22, and irradiated onto the exposed surface of the second exposed object 32 through the second band pass filter 26, and is scanned in the main scanning direction on the exposed surface of the second exposed object 32 according to the rotation of the polygonal rotating mirror 16. Since only a light beam having a longer wavelength of 780 nm is transmitted through the second band pass filter 26, the light beam having the longer wavelength of 780 nm is condensed onto the exposed surface of the second exposed object 32 by the F-θ mirror 18 and is scanned to uniform speed in the main scanning direction of the exposed surface.

In this way, information from different images is recorded by a light beam having a shorter wavelength on the exposed surface of the first exposed object 30, and information from difference images is recorded by a light beam having a longer wavelength on the exposed surface of the second exposed object 32.

The light scanning unit as described above, according to an embodiment of the present invention a composite light source for emitting a plurality of light beams having different wavelengths is used as a light source, an optical system of the light scanning unit is commonly used in light beams having different wavelengths, and an optical system reaching an exposed object after a polygonal rotating mirror is configured by a mirror, such that the configuration of the light scanning unit can be simplified, and a low-priced light scanning unit can be implemented.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A light scanning unit comprising:

a composite light source comprising a plurality of light sources arranged adjacent to one another for emitting coherent light having different wavelengths as a light beam;

a collimator lens which is arranged on an approximately central axis of the light beam emitted by the composite light source, and collimates the light beam emitted from the composite light source;

a cylinder lens for condensing the light beam emitted from the collimator lens;

a polygonal rotating mirror for scanning the light beam condensed by the cylinder lens in a main scanning direction on an exposed surface of at least one exposed object;

a half mirror for splitting the light beam emitted from the composite light source; and a band pass filter, which directly transmits only light having a predetermined wavelength of the light beam split by the half mirror onto an exposed surface.

2. The light scanning unit of claim 1, wherein the half mirror splits the light beam with respect to different wavelengths after being reflected from a polygonal rotating mirror, so as to radiate different wavelengths onto respective exposed surfaces of the different said exposed objects.

3. The light scanning unit of claim 2, further comprising:

an F-θ mirror arranged in a light path between the half mirror and the polygonal rotating mirror, the F-θ mirror adapted to reflect the light beam from the polygonal rotating mirror onto an image surface and make the scanning speed of the exposed point be substantially uniform.

4. A method of scanning an image, comprising:

emitting coherent light having different wavelengths as a light beam via a composite light source comprising a plurality of light sources arranged adjacent to one another;

collimating the light beam emitted from the composite light source via a collimator lens which is arranged on an approximately central axis of the light beam emitted by the composite light source;

condensing the light beam emitted from the collimator lens via a cylinder lens;

scanning the light beam condensed by the cylinder lens in a main scanning direction on an exposed surface of at least one exposed object via a polygonal rotating mirror;

splitting the light beam emitted from the composite light source via a half mirror; and directly transmitting only light having a predetermined wavelength of the light beam split by the half mirror onto an exposed surface via a band pass filter.

5. The method of claim 4, the step of splitting further comprises:

splitting the light beam with respect to different wavelengths after being reflected from a polygonal rotating mirror, so as to radiate different wavelengths onto respective exposed surfaces of the different said exposed objects.

6. The method of claim 5, further comprising:

reflecting the light beam from the polygonal rotating mirror onto an image surface and make the scanning speed of the exposed point be substantially uniform via an F-θ mirror.

7. The method of claim 6, wherein the F-θ mirror is arranged in a light path between the half mirror and the polygonal rotating mirror.

* * * * *